(12) United States Patent
Okuda

(10) Patent No.: US 6,501,245 B2
(45) Date of Patent: Dec. 31, 2002

(54) RECHARGEABLE BATTERY FOR HEADLIGHT AND ATTACHING STRUCTURE THEREOF

(75) Inventor: Yoji Okuda, Tondabayashi (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 09/961,654

(22) Filed: Sep. 24, 2001

(65) Prior Publication Data

US 2002/0041177 A1 Apr. 11, 2002

(30) Foreign Application Priority Data

Oct. 11, 2000 (JP) ........................................ 2000-310186

(51) Int. Cl.⁷ ................................................ H01L 7/00

(52) U.S. Cl. ...................................... 320/112; D13/103

(58) Field of Search ................................ 320/112, 107; 429/96, 100; D13/103

(56) References Cited

U.S. PATENT DOCUMENTS

| 5,170,981 A | | 12/1992 | Lin ........................ 248/311.2 |
| 5,436,810 A | | 7/1995 | Sutherland et al. ........... 362/72 |
| 5,764,025 A | * | 6/1998 | Lehmann ..................... 320/105 |
| 5,833,188 A | | 11/1998 | Studdiford et al. ..... 248/229.17 |
| 6,285,160 B1 | * | 9/2001 | Tsai .......................... 180/68.5 |
| 2001/0035736 A1 | * | 11/2001 | Person ....................... 320/114 |

FOREIGN PATENT DOCUMENTS

JP           10223193 A  *  8/1998  ............ H01M/2/10

* cited by examiner

*Primary Examiner*—Gregory J. Toatley, Jr
(74) *Attorney, Agent, or Firm*—Olson & Hierl, Ltd.

(57) ABSTRACT

A rechargeable battery for a headlight that can be firmly attached to a bicycle in a variety of locations including a bottle holder, and an attaching structure for attaching the rechargeable battery to the bicycle are provided. The rechargeable battery for the headlight attached to the bicycle includes a wire to electrically connect the rechargeable battery to the headlight, and a through hole to let through a belt for attaching the body of the rechargeable battery to the bicycle.

17 Claims, 4 Drawing Sheets

RECHARGEABLE BATTERY FOR HEADLIGHT AND ATTACHING STRUCTURE THEREOF

BACKGROUND OF THE INVENTION

1. Field of the Invention

The present invention relates to a rechargeable battery for the headlight of a bicycle, and an attaching structure thereof.

2. Description of the Background Art

A rechargeable battery for the headlight of a bicycle is comparatively heavy in weight, and its displacement from the mounted location or jolting during traveling would cause trouble. Therefore, it is necessary to maintain the battery stably in the mounted location over a long period of time of traveling. Conventionally, a bottle holder or bottle cage provided on a down tube of a bicycle frame for holding a water bottle or the like has been utilized to attach the battery to the bicycle. Further, the length of a wire for connecting the battery to the headlight has been fixedly set according to the attached location of the bottle holder.

However, unlike the bottle holder which should hold the bottle in an upward position to prevent spilling of the content, the rechargeable battery for the headlight can be attached to the bicycle frame in various locations in any position or posture. Besides, it is desired to achieve firmer attachment of the battery to the bottle holder. Accordingly, there has been a demand for development of a way of attaching the rechargeable battery for the headlight to a bicycle in any position or attitude in a location other than the bottle holder.

SUMMARY OF THE INVENTION

An object of the present invention is to provide a rechargeable battery for a headlight that can be securely attached to a bicycle in a variety of locations including a bottle holder, and to provide an attaching structure therefor.

The rechargeable battery for a headlight according to the present invention is used for the headlight of a bicycle. The rechargeable battery includes a wire to electrically connect the rechargeable battery to the headlight, and a through hole to let through a belt for attaching the rechargeable battery body to the bicycle.

The belt passed through the through hole is fastened around a bicycle frame, so that the rechargeable battery can be firmly secured. It is preferred to provide two such through holes, which are preferably arranged such that two belts are tied around respective tubes of the frame at the corner where the two tubes intersect with each other. As a result, it becomes possible to secure the rechargeable battery for the headlight more firmly to the bicycle in various locations thereof.

The rechargeable battery for the headlight may be provided with a groove to wind the wire thereon.

To allow attachment of the rechargeable battery for the headlight to a bicycle in a variety of mounting locations, the wire for electrically connecting the rechargeable battery to the headlight should have a length long enough to reach the farthest possible location. When the rechargeable battery provided with such a long wire is being attached to a location near the headlight, the loosely hanging wire may become an obstacle to pedaling, or be entangled with the spoked wheel when travelling. Provision of the wire winding groove makes it possible to prevent the slack of the wire when the rechargeable battery is attached near the headlight, and hence to prevent such undesirable conditions which may cause an accident.

The rechargeable battery for the headlight may further be provided with means for temporarily holding the wire.

When the slack of the wire is wound onto the groove, it may come loose during traveling. Provision of the temporary holding means can prevent the wound wire from coming loose.

The temporary holding means may be a tubular groove that is formed at a portion of the rechargeable battery facing the wire winding groove to temporarily hold the wire along a direction intersecting the direction of the wire wound on the groove.

Provision of such a temporary holding means makes it possible to temporarily retain the wire in close proximity to the wire winding groove along the direction crossing the wire winding direction, and therefore, the wire can be maintained stably in the anchored state. Specifically, the longitudinal direction of the tubular groove intersects the wire winding direction. Thus, even if there is a force operating to loosen the wound wire, the wire is pressed against the corner where the two directions are crossing, and such contact with the corner applies large frictional force to the wire. Accordingly, the force operating to loosen the wound wire is considerably lessened by the strong frictional force at the corner and kept from propagating any further, whereby the slack of the wire is prevented reliably. Herein, the tubular groove refers to a groove having a cross section that is greater in width at the inner room than at the opening thereof. Thus, once the wire is pressed and inserted into the groove, it will not readily escape therefrom.

The wire provided to the rechargeable battery is preferably a stretchable cord having elastic restoring force.

In this case, even if the rechargeable battery is being attached to the bicycle in a location requiring the maximum length of the cord, the elastic restoring force can be generated by winding the cord on the groove. Accordingly, the cord is maintained constantly in the strained or tense state via its portion pressed into the tubular groove, so that the slack of the wound cord can be prevented still more reliably. Examples of such an extensible cord with elastic storing force may include a curled cord and others.

The rechargeable battery for the headlight of the present invention may further include a lengthwise depression that is provided on a surface of the rechargeable battery sandwiched between openings at both ends of the through hole and extends along a direction intersecting the direction coupling the two openings.

The lengthwise depression comes into contact with the bicycle frame. It increases the contact area between the rechargeable battery and the bicycle frame, thereby enabling still more stable attachment of the rechargeable battery to the frame. The aforementioned surface of the rechargeable battery sandwiched between the openings of the through hole on which the lengthwise depression is to be formed may be either the surface on the shorter circumferential side or the surface on the longer circumferential side with respect to the openings.

The rechargeable battery for the headlight preferably includes a plurality of through holes to let belts therethrough.

For example, two such through holes may be provided to the rechargeable battery. In this case, the two through holes are preferably arranged to allow two belts to be tied around respective tubes of the bicycle frame at the corner where the two tubes intersect with each other. As a result, it becomes possible to place the rechargeable battery such that displacement of the rechargeable battery in a direction which would be difficult to prevent with one belt can be readily prevented with the other belt. This further enhances the secure attachment of the rechargeable battery to the bicycle.

The attaching structure of a rechargeable battery for a headlight according to the present invention is used to attach the rechargeable battery as described above to a bicycle, by letting a belt through the through hole and fastening the belt around a member of the bicycle.

With such an attaching structure, it becomes possible to attach the rechargeable battery for the headlight to the bicycle in a variety of locations.

The attaching structure may be provided with an anti-slippage fixing member that is attached to a bicycle frame for receiving the rechargeable battery.

Provision of such an anti-slippage fixing member attached to the frame makes it possible to attach the rechargeable battery to the frame more firmly, without employing two through holes. This further increases the number of locations where the rechargeable battery can be attached to the bicycle. Herein, the anti-slippage fixing member "for receiving" the rechargeable battery may be a simple member gripping the rechargeable battery, or a holder housing the rechargeable battery therein like a bottle cage.

With the attaching structure of the rechargeable battery for the headlight of the present invention, two belts may be passed through the through hole(s) and each belt can be fastened around respective one of two crossing tubes of a bicycle frame.

With such a configuration, it is possible to place the rechargeable battery for the headlight, e.g., at a corner where a top tube and a down tube intersect with each other. In this case, two belts may be passed through a common through hole and tied around the top tube and the down tube, respectively, to secure the rechargeable battery.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

First Embodiment

Figure 1:
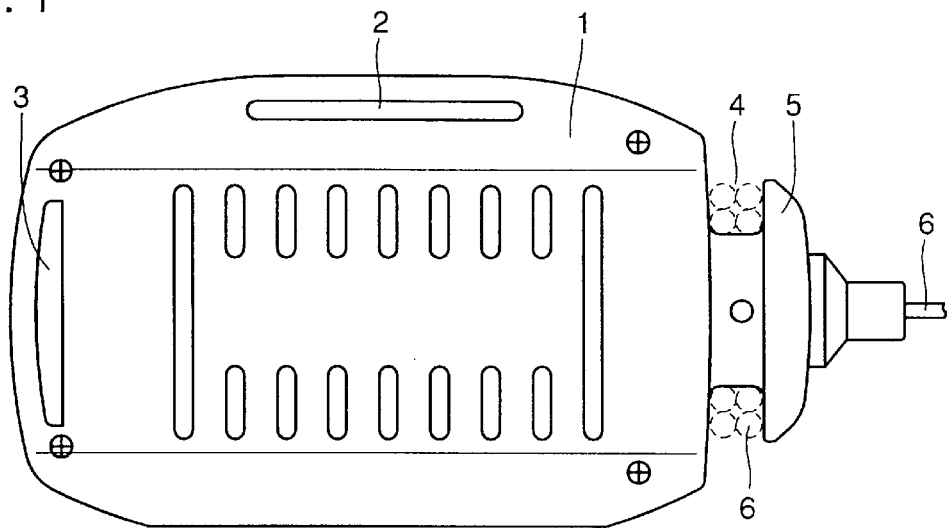
FIGS. 1 and 2 are front and top views, respectively, of a rechargeable battery for a headlight according to a first embodiment of the present invention.
Figure 2:
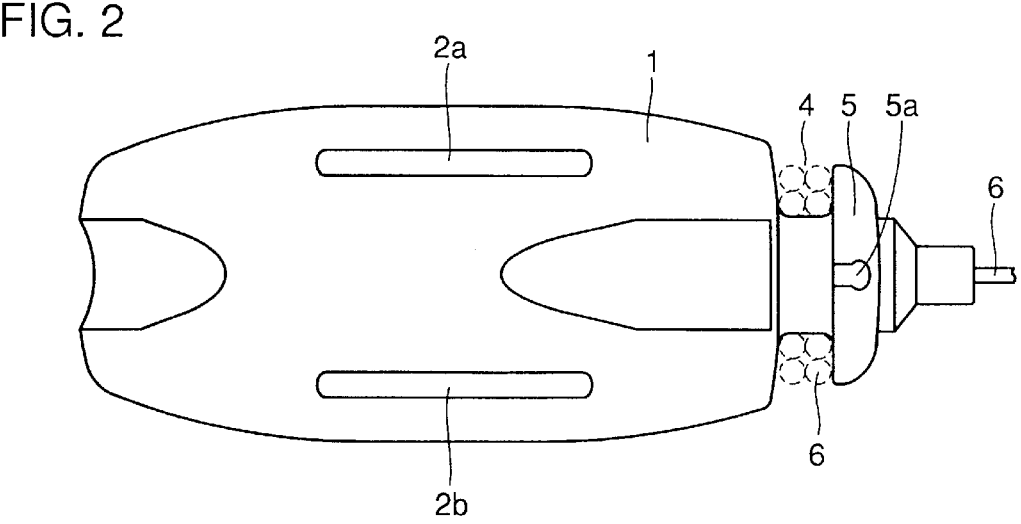
Figure 3:
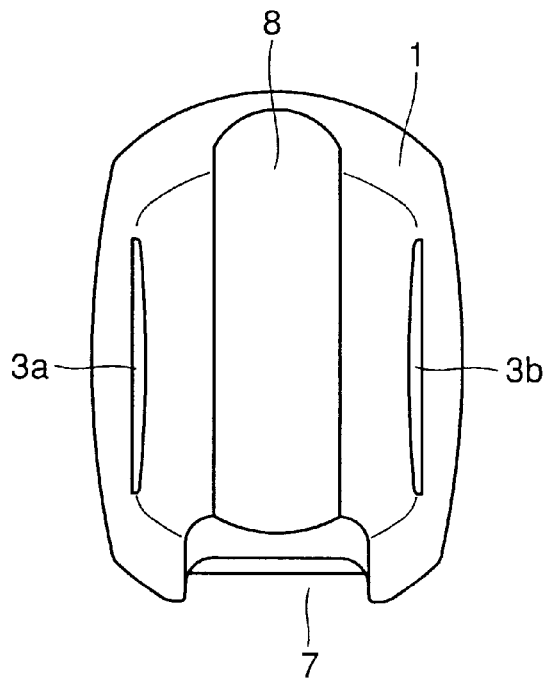
FIGS. 3 and 4 are left and right side views, respectively, of the rechargeable battery for a headlight of the first embodiment.
Figure 4:
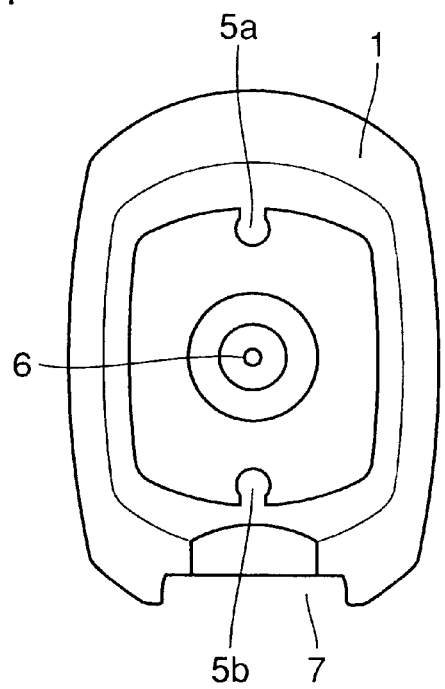

FIGS. 1 and 2 are front and top views, respectively, of the rechargeable battery for a headlight (hereinafter, also referred to as the battery) according to the first embodiment. FIGS. 3 and 4 are left and right side views, respectively, of the rechargeable battery shown in FIGS. 1 and 2. The rechargeable battery houses a lead storage battery therein.

Referring to FIGS. 1–4, belt holes 2 and 3, i.e., through holes for letting through belts, are provided respectively at the upper portion and the left end of the battery body 1. A wire 6 electronically connecting the rechargeable battery and the headlight is pulled out from the right side of battery body 1. A wire winding circumferential groove 4 on which the slack of the wire is being wound is also provided at the right side of battery body 1. Dotted lines forming circles in FIGS. 1 and 2 represent cross sections of the wire wound on circumferential groove 4. A collar portion 5 is provided to the right of groove 4. Collar portion 5 has tubular grooves for temporarily holding a portion of the wire extending from wire winding groove 4 toward the headlight. As shown in FIGS. 2 and 4, these tubular grooves are provided at the top and the bottom of collar portion 5 as upper tubular groove 5a and lower tubular groove 5b, respectively, to extend in a direction intersecting the wire winding direction. Thus, wire 6 comes into contact with a corner of the tubular groove where the wire winding direction and the tubular groove direction intersect with each other. This contact with the corner applies strong frictional force to the wire, so that the slack of the wire is reliably prevented.

As described above, according to the present embodiment, wire winding groove 4 is provided, and in addition, tubular grooves 5a, 5b for temporarily holding the wire are provided to collar portion 5 facing the groove 4. As a result, the wire can be stably kept in a strained state when the rechargeable battery is attached to a bicycle in any of a variety of mounting locations.

Referring to FIGS. 3 and 4, lengthwise depressions 7 and 8 are provided on the surfaces of battery body 1. Specifically, lengthwise depression 7 is located in the middle of the surface, on the longer circumferential side, between two openings 2a and 2b of through hole 2 shown in FIGS. 1 and 2. This lengthwise depression 7 comes into contact with a tube of the bicycle frame when fastening a belt passed through the through hole 2 around the tube to secure the rechargeable battery. Depression 7 increases the contact area between the battery and the frame, and hence increases the stability of the fastening of the belt. Lengthwise depression 8 is located in the middle of the surface, on the shorter circumferential side, between two openings 3a, 3b of through hole 3 shown in FIG. 3. Lengthwise depression 8 is provided in front of through hole 3. When a belt passed through the through hole 3 is being tied around a tube of the frame, lengthwise depression 8 comes into contact with the tube and increases the contact area between the battery and the frame. This again increases the stability of the fastening of the belt.

As described above, according to the present embodiment, two through holes are provided, and lengthwise depressions are also provided corresponding thereto, to increase the contact area between the rechargeable battery and the frame. As a result, it becomes possible, for example, to fasten two belts around two crossing tubes, respectively, so as to firmly secure the rechargeable battery at the corner where the two tubes intersect with each other. The directions along the crossing tubes around which the belts are being fastened are naturally different from each other. Thus, displacement of the battery which would be difficult to prevent by fastening one belt can be prevented by fastening the other belt. As a result, stable and secure attachment of the battery is ensured. A belt passed through one of the two through holes may be fastened around an attachment of a saddle, for example, instead of the tube of the frame. Alternatively, only one through hole may be utilized.

Second Embodiment

In the second embodiment, attachment of the rechargeable battery for the headlight according to the first embodiment to a bicycle will be explained.

Figure 5:
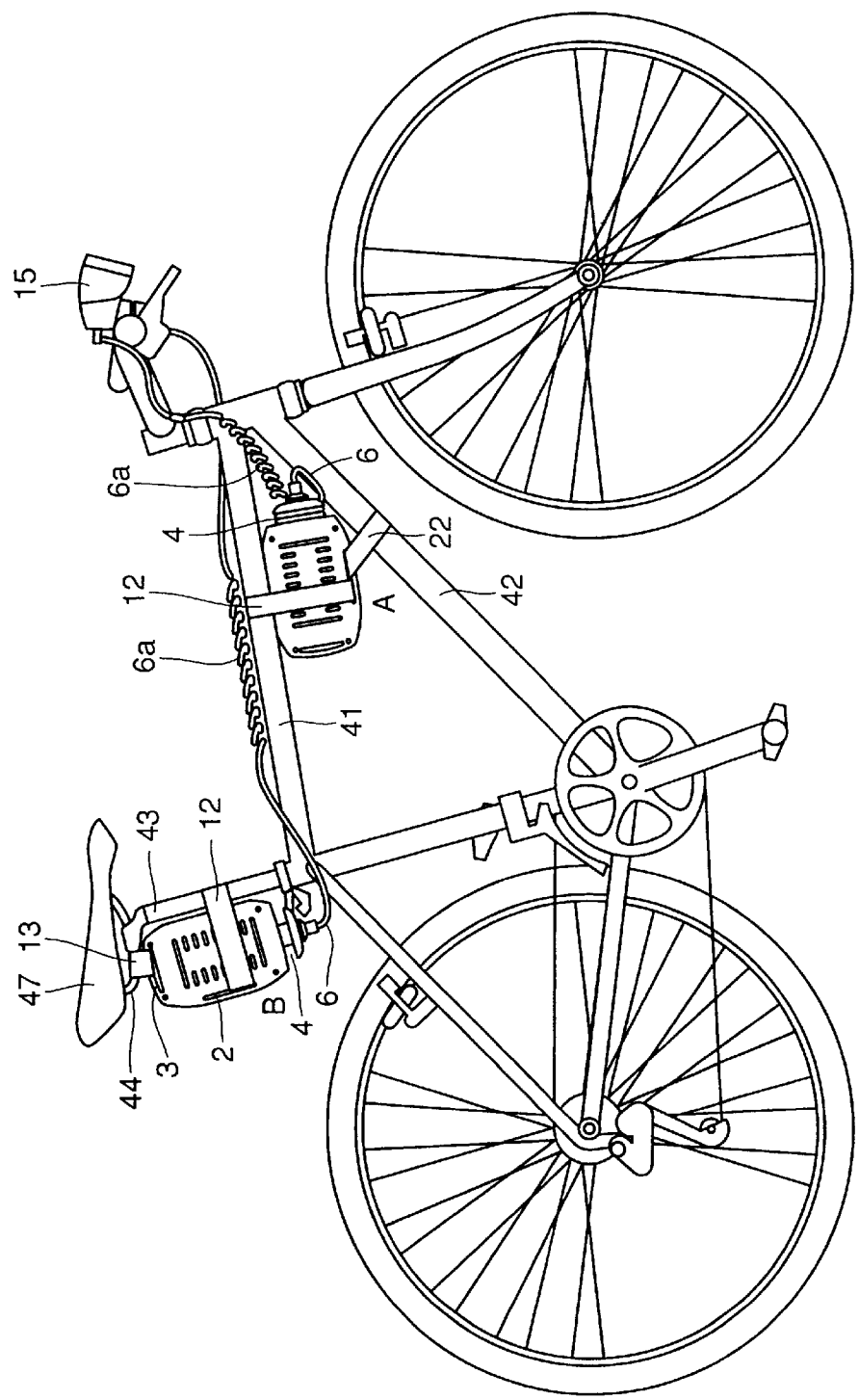
FIGS. 5 and 6 respectively show mounting locations A, B and C, D of the rechargeable battery for a headlight according to a second embodiment of the present invention.

Referring to FIG. 5, the mounting location A of the rechargeable battery to the bicycle frame is located at the corner where a top tube 41 and a down tube 42 of the frame intersect with each other. Two belts 12 and 22 both passed through the through hole 2 are fastened around top tube 41 and down tube 42, respectively, to secure the rechargeable battery. Thus, in mounting location A, only one through hole 2 is used to let through the two belts to attach the battery to the frame. In this location, through the two belts the top and down tubes impose constraint on the rechargeable battery, so that secure attachment thereof is enabled.

Since mounting location A is close to headlight 15, the slack of wire 6 of a large amount is wound onto the wire winding circumferential groove 4. Wire 6 is then pressed into and held at the tubular groove as the temporary holding means (not shown). This wire 6 is a curled cord having a curled portion 6a, which can be extended with elastic restoring force. When the wire is wound with the curled portion being extended, tensile force is applied to the wire by the elastic restoring force. This ensures the temporary anchoring of the wire and also assures orderly arrangement thereof.

In the mounting location B of the rechargeable battery, a belt 13 passed through the through hole 3 is tied around an attachment 44 beneath the saddle 47. Further, belt 12 passed through the through hole 2 is tied around a seat tube 43. The directions along which two belts 12 and 13 are fastened intersect with each other. Thus, the two belts work, complementarily to each other, to prevent displacement of the battery that would be difficult to prevent with the counterpart. Lengthwise depressions 7 and 8 are made to contact the seat tube 43 and the attachment 44 beneath the saddle, respectively, to stabilize and enhance the attachment of the battery, which can be maintained stably with the two belts.

Since mounting location B is the farthest from headlight 15, it is unnecessary to wind the wire on the groove 4. Rather, the curled portion 6a of the curled cord is extended into a strained state.

Figure 6:
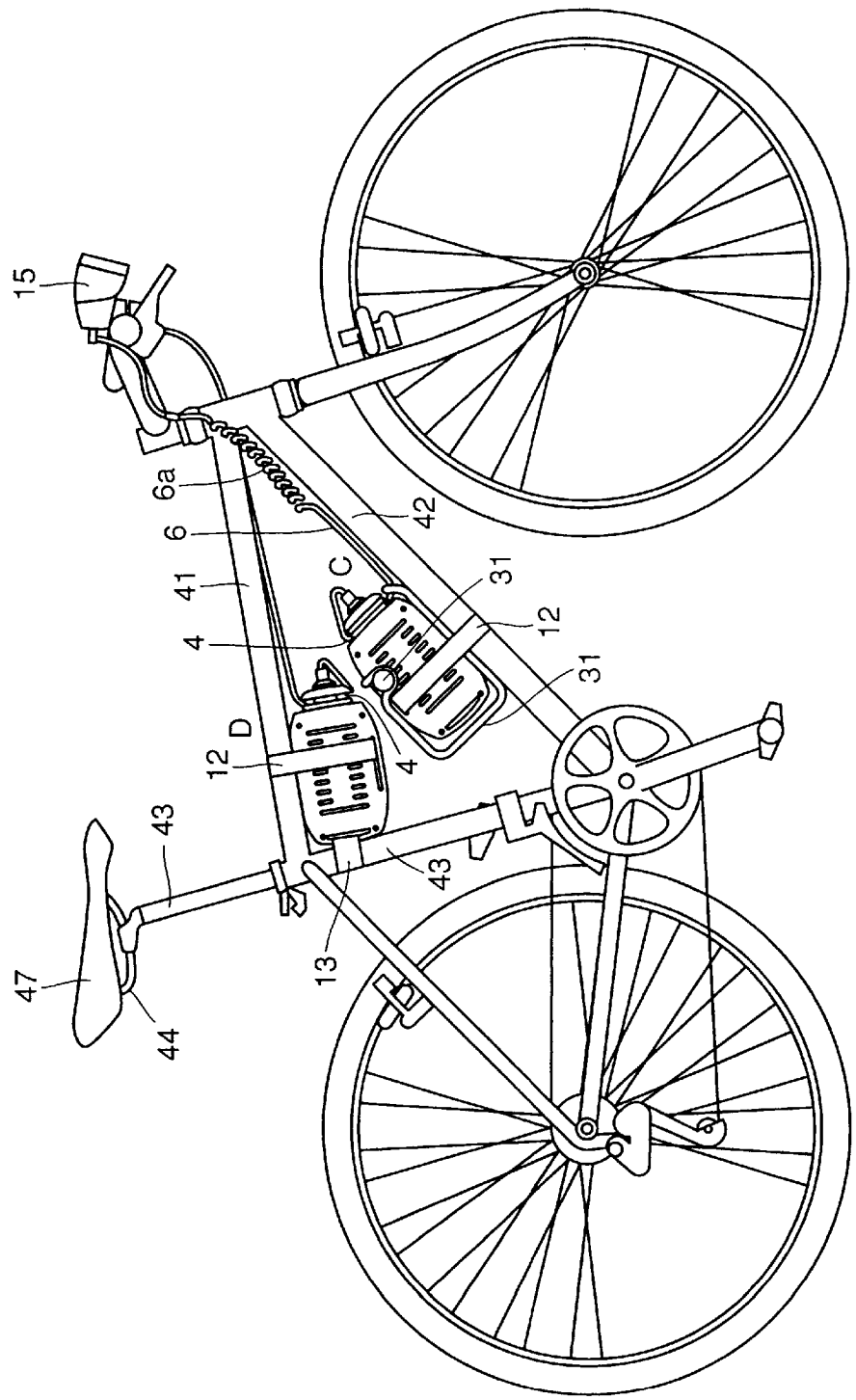

In the mounting location C shown in FIG. 6, belt 12 passed through the through hole 2 is tied around down tube 42. In this case, displacement of the rechargeable battery in a direction along which the through hole extends between its two openings is prevented by a bottle cage 31 attached to down tube 42. Bottle cage 31 serves as an anti-slippage fixing member preventing displacement of the battery along the extended direction of through hole 2 and also prevents movement of the battery in a direction pulled away from the down tube. Belt 12 suppresses the movement of the battery away from down tube 42, and also prevents the movement along the down tube 42. Bottle cage 31 and fastened belt 12 in combination make it possible to stably maintain the firm attachment of the rechargeable battery to the bicycle.

Mounting location C is at a moderate distance from headlight 15. Thus, the wire is wound on the groove 4 as appropriate to extend curled portion 6a to a strained state, thereby enhancing the temporary anchoring of the wire at the tubular groove (not shown).

When a bottle is being used, this mounting location C cannot be utilized for attachment of the rechargeable battery.

The mounting location D is located at the corner where top tube 41 and seat tube 43 intersect with each other. Belt 12 passed through the through hole 2 is fastened around top tube 41, while belt 13 passed through the through hole 3 is tied around seat tube 43. At this time, lengthwise depressions 7 and 8 (not shown) come into contact with top tube 41 and seat tube 43, respectively, to help ensure the stable attachment of the rechargeable battery. In this mounting location D, again, the belt winding directions intersect with each other. Accordingly, the two belts work, complementarily to each other, to prevent displacement of the battery in a direction which would be difficult to prevent with the counterpart.

Mounting location D is again at a moderate distance from headlight 15. Thus, the curled cord 6 is wound on circumferential groove 4 to an extent that the curled portion is extended appropriately. The cord without the slack is then pressed into the tubular groove (not shown) for temporarily anchoring the wire.

As explained above, the reliable attaching structure of the present embodiment can be realized by attaching the rechargeable battery of the present invention to a bicycle in any of the mounting locations A, B, C and D. The rechargeable battery of the present invention is provided with the wire winding groove. Thus, even when the rechargeable battery is being attached to the bicycle in the closest mounting location from the headlight, the wire length can be adjusted to prevent the slack of the wire.

The mounting location of the rechargeable battery is not limited to those four locations explained above. Any desired mounting location can be selected according to the type of the bicycle or the user's preference.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rechargeable battery for a headlight attached to a bicycle, comprising:
    a wire electrically connecting said rechargeable battery and the headlight; and
    a through hole to let through a belt for attaching said rechargeable battery to the bicycle.

2. The rechargeable battery for a headlight according to claim 1, further comprising a groove for winding said wire thereon.

3. The rechargeable battery for the headlight according to claim 2, further comprising means for temporarily holding said wire.

4. The rechargeable battery for the headlight according to claim 3, wherein said temporary holding means is a tubular groove that is formed at a portion of said rechargeable battery facing said groove and temporarily holds said wire along a direction intersecting a direction of said wire wound on said groove.

5. The rechargeable battery for the headlight according to claim 1, wherein said wire is a stretchable cord with elastic restoring force.

6. The rechargeable battery for the headlight according to claim 2, wherein said wire is a stretchable cord with elastic restoring force.

7. The rechargeable battery for the headlight according to claim 1, comprising a plurality of said through holes.

8. The rechargeable battery for the headlight according to claim 7, comprising a lengthwise depression provided on a surface of said rechargeable battery between openings at both ends of said through hole and extending in a direction intersecting a direction coupling the openings of said through hole.

9. An attaching structure of a rechargeable battery for a headlight for attaching said rechargeable battery to a bicycle, wherein said rechargeable battery for the headlight includes a wire to electrically connect said rechargeable battery to the headlight, and a through hole to let through a belt for attaching said rechargeable battery to the bicycle, and said rechargeable battery for the headlight is attached to the bicycle by fastening the belt passed through said through hole around a member of said bicycle.

10. The attaching structure of the rechargeable battery for the headlight according to claim 9, comprising an anti-slippage fixing member provided to a frame of said bicycle to receive said rechargeable battery for the headlight.

11. The attaching structure of the rechargeable battery for the headlight according to claim 9, wherein two said belts are passed through said through hole of said rechargeable battery and each said belt is tied around respective one of two crossing tubes of a frame of said bicycle.

12. Battery means for a headlight to be attached to a bicycle comprising a body means, wire means extending from the body means for electrically connecting said rechargeable battery and said headlight, receiving means on the body means for receiving wire means wound on the body means, and through-hole means on the body means for receiving a belt for attaching the body means to a bicycle.

13. Battery means as in claim 12, wherein the receiving means comprise a groove on the body means for winding wire thereon.

14. Battery means as in claim 12, including means for temporarily holding the wire means on the body means.

15. Battery means as in claim 12, wherein said wire means is a stretchable cord with elastic restoring force.

16. Battery means as in claim 12, wherein the through-hole means comprises a plurality of through-holes.

17. Battery means as in claim 16, including a lengthwise depression provided on a surface of the body means of the rechargeable battery between openings at both ends of said through hole means and extending in a direction intersecting a direction coupling the openings of said through holes.

* * * * *